(12) United States Patent
Rubie

(10) Patent No.: US 10,119,653 B2
(45) Date of Patent: Nov. 6, 2018

(54) SUSPENSION AND GUIDANCE APPARATUS FOR TOOL RELATIVE TO A MILL

(71) Applicant: Russell Mineral Equipment Pty Ltd, Toowoomba (AU)

(72) Inventor: Peter John Rubie, Toowoomba (AU)

(73) Assignee: Russell Mineral Equipment Pty Ltd, Queensland (AU)

( * ) Notice: Subject to any disclaimer, the term of this patent is extended or adjusted under 35 U.S.C. 154(b) by 378 days.

(21) Appl. No.: 14/768,155

(22) PCT Filed: Feb. 13, 2014

(86) PCT No.: PCT/AU2014/000120
§ 371 (c)(1),
(2) Date: Aug. 14, 2015

(87) PCT Pub. No.: WO2014/124491
PCT Pub. Date: Aug. 21, 2014

(65) Prior Publication Data
US 2016/0003407 A1 Jan. 7, 2016

(30) Foreign Application Priority Data
Feb. 14, 2013 (AU) .............................. 2013900467

(51) Int. Cl.
F16M 11/20 (2006.01)
B02C 17/18 (2006.01)
B25J 9/02 (2006.01)
F16M 11/04 (2006.01)
F16M 11/08 (2006.01)

(52) U.S. Cl.
CPC ......... *F16M 11/2028* (2013.01); *B02C 17/18* (2013.01); *B25J 9/026* (2013.01);
(Continued)

(58) Field of Classification Search
CPC ......... B23C 1/002; B23C 1/005; B23C 1/007; B23C 1/12; B23C 3/02; B23C 3/023;
(Continued)

(56) References Cited

U.S. PATENT DOCUMENTS 2,948,168 A * 8/1960 McCormick ............ B23B 39/14
144/24.09
3,559,529 A * 2/1971 Vertin ....................... B23C 1/12
409/107
4,018,393 A 4/1977 Larsen
(Continued)

*Primary Examiner* — Christopher M Koehler
(74) *Attorney, Agent, or Firm* — Jay Schloff; Aidenbaum Schloff and Bloom PLLC

(57) ABSTRACT

An apparatus for suspending and guiding at least first and second linerbolt removal tools externally of a grinding mill. The first linerbolt removal tool is associated with a first carriage assembly and used for knocking out linerbolts on a cylindrical main body portion of the mill. The second linerbolt removal tool is associated with a second carriage assembly and used for knocking linerbolts on a frusto-conical end portion of the mill. Each of the first and second carriage assemblies providing no more than three degrees of freedom to their respective first and second linerbolt removal tools, and wherein at least one of the degrees of freedom is angular movement about the axis of rotation of said mill.

20 Claims, 4 Drawing Sheets

(52) U.S. Cl.
CPC ........... *F16M 11/048* (2013.01); *F16M 11/08* (2013.01); *F16M 11/2085* (2013.01)

(58) Field of Classification Search
CPC ......... B23C 3/026; B23B 39/12; B23B 39/14; F16M 11/2028; F16M 11/048; F16M 11/08; F16M 11/2085; B02C 17/18; B25J 9/026
USPC .................................................... 901/16, 17
See application file for complete search history.

(56) References Cited

U.S. PATENT DOCUMENTS

| | | | |
|---|---|---|---|
| 4,773,815 A | 9/1988 | Lemelson | |
| 4,781,517 A * | 11/1988 | Pearce | B23P 19/04 104/167 |
| 5,375,313 A | 12/1994 | Apodaca et al. | |
| 6,904,980 B2 | 6/2005 | Rubie | |
| 8,196,676 B2 | 6/2012 | Rubie | |
| 8,359,944 B2 * | 1/2013 | Li | B25J 5/02 74/490.03 |
| 2003/0056352 A1 | 3/2003 | McLellan et al. | |
| 2001/0180678 | 8/2007 | Salamanca | |
| 2007/0180678 A1 * | 8/2007 | Salamanca | B02C 17/00 29/426.4 |
| 2009/0143207 A1 * | 6/2009 | Wampler | B23C 1/002 483/51 |
| 2010/0057254 A1 | 3/2010 | Salamanca et al. | |
| 2012/0102703 A1 | 5/2012 | Salamanca | |

* cited by examiner

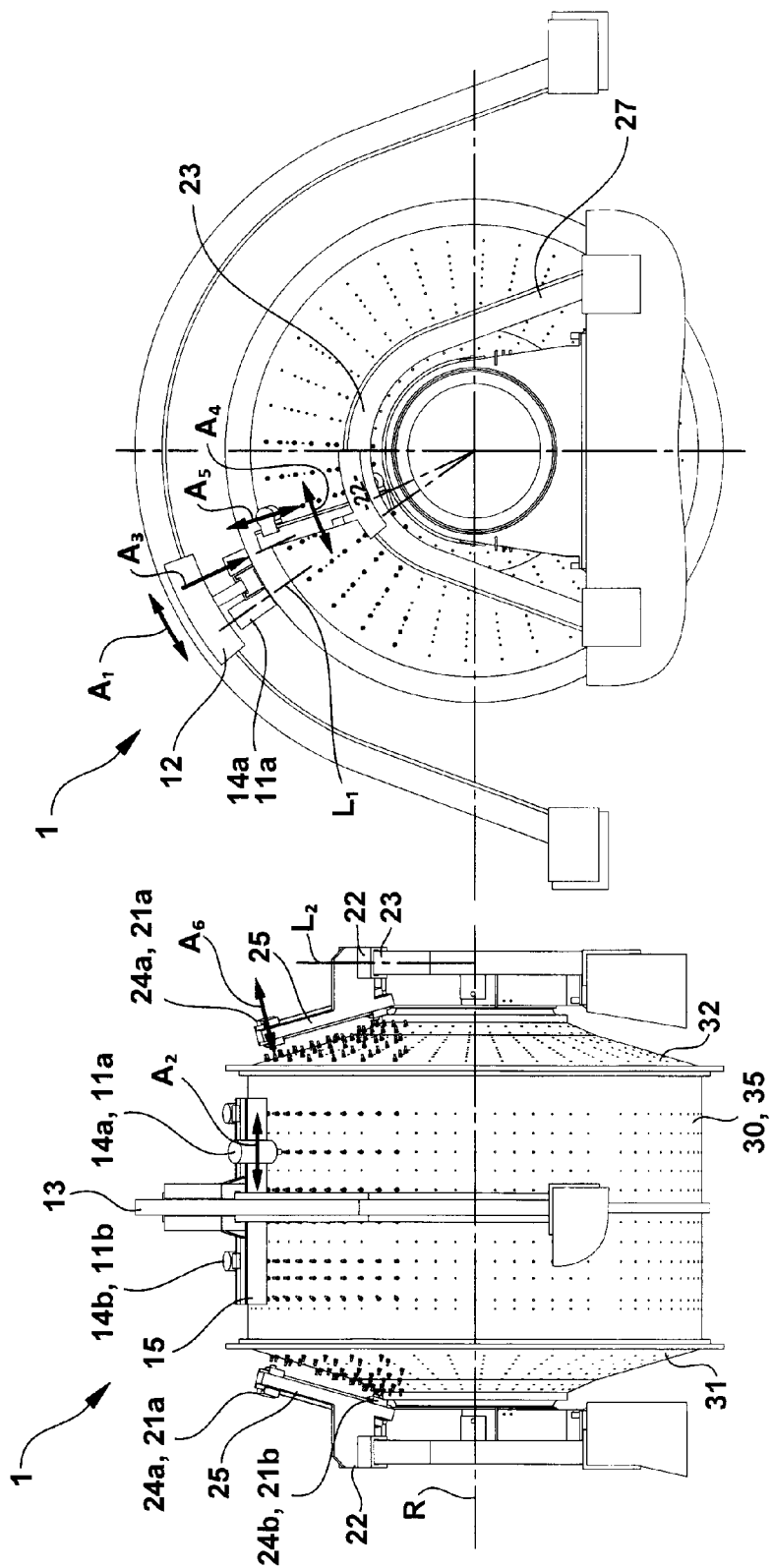

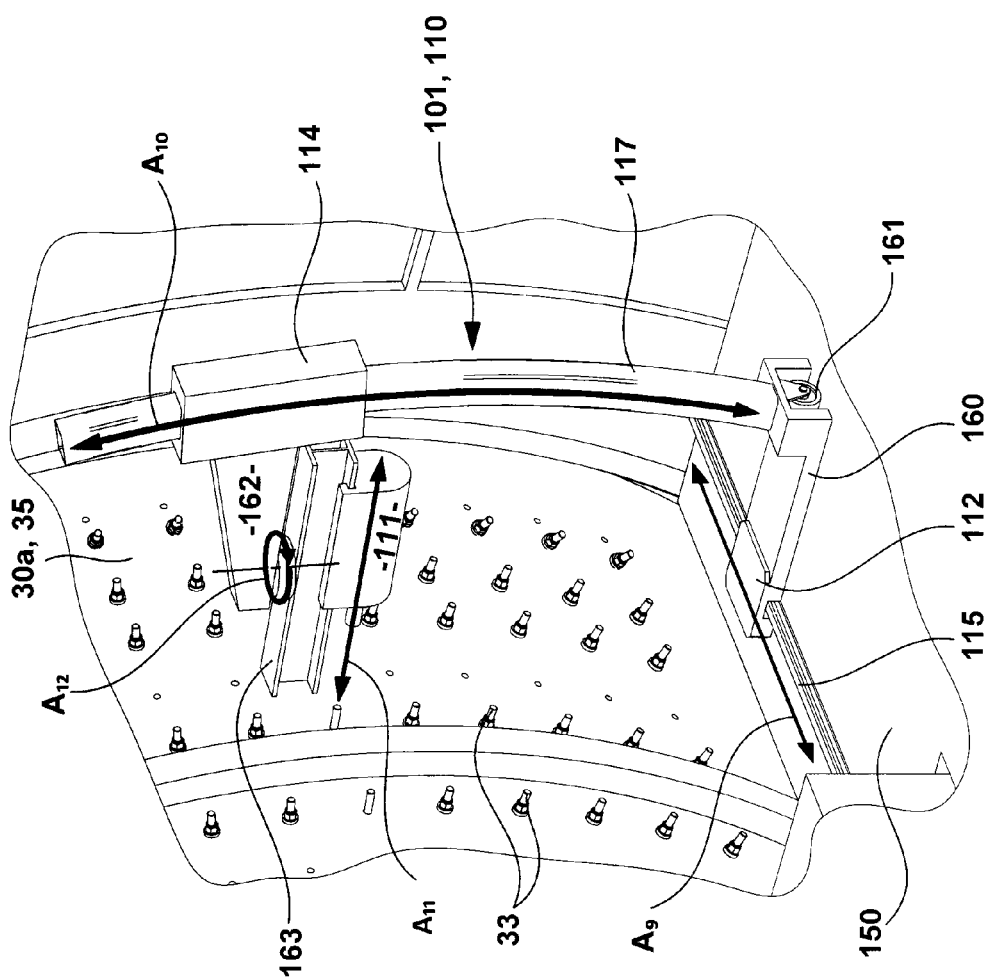

SUSPENSION AND GUIDANCE APPARATUS FOR TOOL RELATIVE TO A MILL

TECHNICAL FIELD

The present invention relates to an apparatus for suspension and guidance of tools relative to a mill. In particular, the invention is directed to an apparatus for suspension and guidance of tools, such as linerbolt removal tools, externally of a grinding mill.

BACKGROUND

Sacrificial liners are secured to the internal casing of ore mills. They are typically provided as segments, and they are secured internally of the mill shell by bolts which are fitted from the internal side of the shell and project through apertures in the liners and through mounting bores in the shell. A nut and sealing washer are threaded onto and tightened onto each bolt from outside the shell, drawing the liner to the inner surface of the shell. An example of a conventional liner segment fastener system is shown in US Pat. No. 4,018,393 (Larsen). Typically the bolts used for such application are referred to as linerbolts.

Ore mills are generally run continuously for economic efficiency. The continuous process wears down the liners over a period of time, which will depend on the type of ore and application, after which the liners will have to be replaced. Because down time of the ore mill adversely affects the economic efficiency of the process, it is essential to change liners as quickly as possible.

In such applications, the bolts on liners become corroded and clearances between bolts and holes become compacted with ore fines. This results in difficult bolt removal. As a result the many bolts that are utilised to attach the liners to the mill shell are often required to be freed manually by the use of large sledge-hammers, and more frequently by percussive devices such as jack-hammers and hydraulically powered hammers to provide repetitive impacts.

Liner replacement involves removal of nuts, typically followed by hammering the exposed bolt from the outside the mill. In known hammering devices capable of delivering the necessary impacts, a high reaction force is produced which necessitates that such devices be carried by articulating machines or be rigidly attached to some support structure. Various types of hydraulic and pneumatic hammering devices, commonly referred as linerbolt removal tools, are shown in International publication WO97/26116 (Russell Mineral Equipment Pty Ltd), US Pat. No. 6,904,980 (Rubie) and US Pat. No. 8,196,676. (Rubie).

Typically linerbolt removal tools are suspended from monorails or telescoping jibs, which requires manual manipulation and leads to error in tool alignment. Whilst efficiency has improved over the years with use of linerbolt removal tools, it is desirable to further improve the replacement of liners.

US Patent Publication No. 2007/0180678 (Salamanca) and US Patent Publication No. 2012/0102703 (Salamanca) propose a robotized method of removing bolts from SAG and/or ball mills. A five-axis anthropomorphic robot mounted on rails is used to address handling and alignment issues. However, such an anthropomorphic robot is an expensive option particularly when two or more robots are disposed around the mill. Furthermore such robot requires a complicated control system.

The present invention seeks to overcome at least some of the abovementioned disadvantages by providing an improved apparatus for suspending and guiding a tool externally of a grinding mill.

SUMMARY OF THE INVENTION

According to a first aspect the present invention consists in an apparatus for suspending and guiding at least one tool externally of a grinding mill, said apparatus provides four or less degrees of freedom to said at least one tool, and wherein at least one of said degrees of freedom is angular movement about the axis of rotation of said mill.

Preferably in one embodiment said four or less degrees of freedom is three degrees of freedom.

Preferably a second of said three degrees of freedom is linear movement along an axis parallel to the axis of rotation of said mill, and a third of said three degrees of freedom is linear movement along a line radiating from said axis of rotation.

Preferably a second of said three degrees of freedom is linear movement along a second axis offset to the axis of rotation of said mill, and a third of said three degrees of freedom is linear movement along a line orthogonal to said second axis.

Preferably at least one tool is a first tool and said mill has a cylindrical main body, and said apparatus comprises a first curved rail disposed outside and at least partially surrounding said cylindrical main body such that it is centred on the axis of rotation of said mill, a primary carriage is mounted for travel along said first curved rail, and a substantially straight second rail parallel to the axis of rotation of said mill is mounted to said first primary carriage, and at least one first tool carriage is mounted for travel along said second rail, said first tool mounted to said first tool carriage via a first slide mechanism and oriented such that the centre of said first tool is located on a first line radiating from the axis of rotation of said mill, said first slide mechanism allowing said first tool to move along said first line.

Preferably said mill has opposed frusto-conical ends connected to said cylindrical main body, and said apparatus further comprising at least a second curved rail adjacent one of said opposed frusto-conical ends and centred on the axis of rotation of said mill, a second primary carriage is mounted for travel along said second curved rail, a substantially straight third rail extends from said second primary carriage such that it is angled at the same angle as said one of said opposed frusto-conical ends and is offset from a second line radiating from the axis of rotation of said mill, and at least one second tool carriage is mounted for travel along said third rail, and a second tool is mounted to said second tool carriage via a second slide mechanism, for axial movement thereof.

Preferably said first curved rail is part of a first arch spanning over said cylindrical main body.

Preferably said second curved rail is part of a second arch.

Preferably said first tool is a linerbolt removal tool.

Preferably said second tool is a linerbolt removal tool.

According to a second aspect the present invention consists in an apparatus for suspending and guiding at least first and second linerbolt removal tools externally of a grinding mill, said first linerbolt removal tool associated with a first carriage assembly and used for knocking out linerbolts on a cylindrical main body portion of said mill, said second tool associated with a second carriage assembly and used for knocking out linerbolts on a frusto-conical end portion of said mill connected to said cylindrical main body portion, said first carriage assembly providing no more than four degrees of freedom to its respective first linerbolt removal tool, said second carriage assembly providing no more than three degrees of freedom to its respective second linerbolt removal tool and wherein at least one of said degrees of freedom for each of said first and second assemblies is angular movement about the axis of rotation of said mill.

Preferably said first carriage assembly comprising a first primary carriage mounted on a first curved rail disposed outside and at least partially surrounding said cylindrical main body such that it is centred on the axis of rotation of said mill, and a substantially straight second rail parallel to the axis of rotation of said mill is mounted to said first primary carriage, and a first secondary carriage is mounted for travel along said second rail, said first linerbolt removal tool mounted to said first secondary carriage via a first slide mechanism and oriented such that the centre of said tool is located on a first line radiating from the axis of rotation of said mill, said first slide mechanism allowing said tool to move along said first line.

Preferably said first slide mechanism is pivotally mounted to said first secondary carriage.

Preferably said second carriage assembly comprising a second primary carriage mounted for travel along a second curved rail adjacent said frusto-conical end, a substantially straight third rail extends from said second primary carriage such that it is angled at the same angle as said opposed frusto-conical end and is offset from a second line radiating from the axis of rotation of said mill, a second slide mechanism mounted to said second primary carriage supports a second linerbolt removal tool for axial movement thereof along said second line.

Preferably said first curved rail is part of a first arch spanning over said cylindrical main body.

Preferably said second curved rail is part of a second arch.

Preferably a third linerbolt removal tool associated with third carriage assembly and similar to that of the second carriage assembly, said third linerbolt removal tool and its associated carriage assembly used for knocking out linerbolts on an opposed frusto-conical end portion of said mill.

According to a third aspect the present invention consists in an apparatus for suspending and guiding at least a first tool externally of a grinding mill, said first tool associated with a carriage assembly and used for knocking out linerbolts on a cylindrical main body portion of said mill, said carriage assembly providing no more than four degrees of freedom to its respective first tool, and wherein at least one of said degrees of freedom is angular movement about the axis of rotation of said mill.

Preferably said carriage assembly comprises a base rail oriented parallel to the axis of rotation of said mill, a base carriage is mounted for travel along said base rail, said base carriage supports an upwardly extending rail having at least a curved portion, a tool carriage is mounted for travel along said base rail and movement of said tool carriage relative to said curved portion of said upwardly extending rail is angular movement about the axis of rotation of said mill, and a slide mechanism is mounted to said tool carriage, said slide mechanism slidably supporting said first tool so that it can be oriented such that the centre of said tool is located on a first line radiating from the axis of rotation of said mill, said first slide mechanism allowing said tool to move along said first line.

Preferably said slide mechanism is pivotally mounted to said tool carriage.

BRIEF DESCRIPTION OF THE DRAWINGS

A preferred embodiment of the invention will now be described, by way of example only, with reference to the accompanying drawings in which:

FIG. 2 is an elevational view of the apparatus depicted in FIG. 1.

FIG. 3 is an end view of the apparatus depicted in FIG. 1.

FIG. 5 is a perspective view of a third embodiment of an apparatus for suspending and guiding a linerbolt removal tool in accordance with the present invention.

BEST MODE OF CARRYING OUT INVENTION

Figure 1:
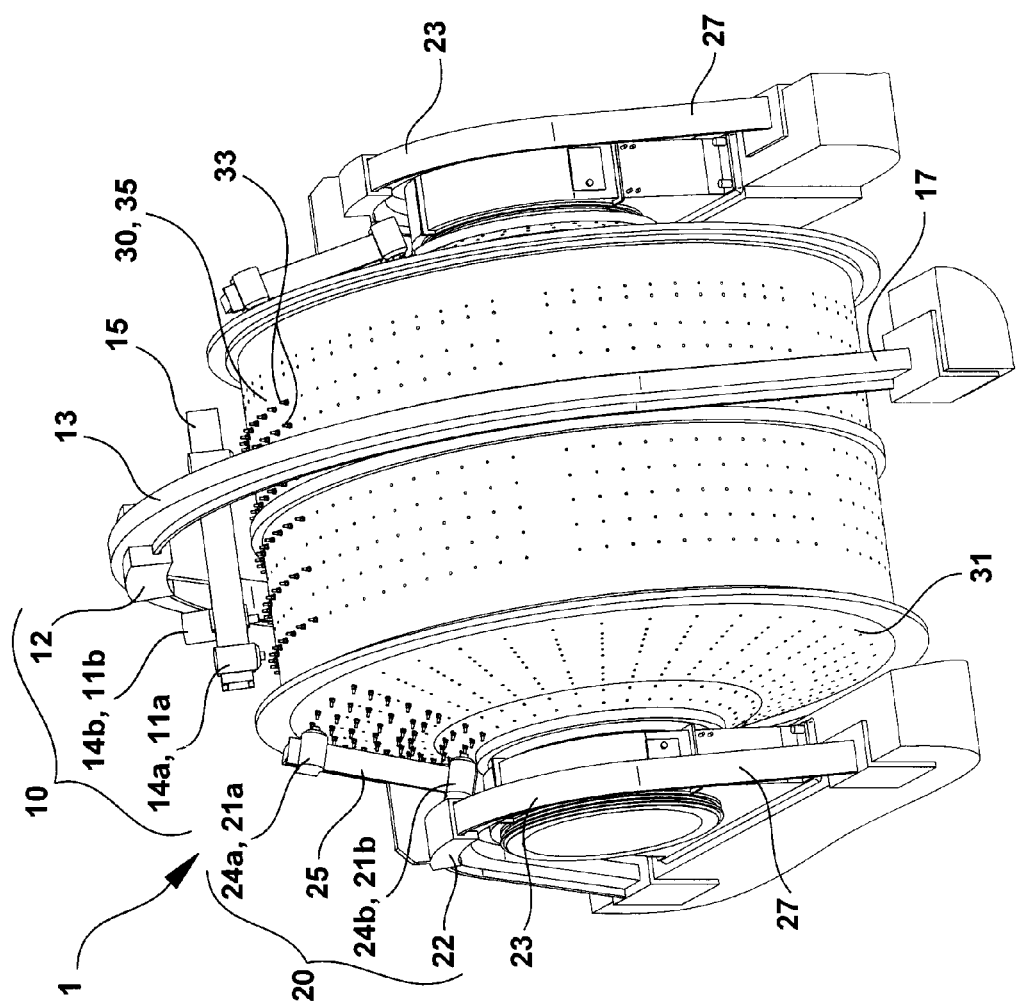
FIG. 1 is a perspective view of a first embodiment of an apparatus for suspending and guiding a linerbolt removal tool in accordance with the present invention.

FIGS. 1 to 3 depict a first embodiment of an apparatus 1 for suspending and guiding linerbolt removal tools 11,21 externally of a grinding mill 30.

Grinding mill 30 is a SAG or ball ore mill of a conventional type which has sacrificial liners (not shown) secured to the internal casing (not shown). Mill 30 has a cylindrical main portion 35 disposed between two frusto-conical end portions 31, 32. Linerbolts 33 are used to secure the sacrificial liners to mill 30.

Apparatus 1 comprises a first carriage assembly 10 associated with first linerbolt removal tools 11a,11b used for knocking out linerbolts 33, on cylindrical main body portion 35 of grinding mill 30.

Apparatus 1 also comprises a second carriage assembly 20 associated with linerbolt removal tools 21a,21b used for knocking out linerbolts 33 on frusto-conical end portion 31 of grinding mill 30. An identical second carriage assembly 20 and linerbolt removal tools 21 are also used for knocking out linerbolts 33 on the opposed frusto-conical end portion 32.

Each of the first and second carriage assemblies 10, 20 provide no more than three degrees of freedom to their associated linerbolt removal tools 11a,11b, 21a and 21b.

First carriage assembly 10 comprises a first primary carriage 12 mounted for travel on a first curved rail 13 disposed outside and surrounding body portion 35 of mill 30. Curved rail 13 is centred on the axis of rotation R of mill 30, and is integral and forms the central portion of arch 17. A substantially straight second rail 15, having a longitudinal axis parallel to the axis of rotation R is mounted to first primary carriage 12. Tool carriages 14a,14b are mounted for travel along opposite sides of second rail 15.

Each tool carriage 14a, 14b has respective linerbolt removal tools 11a,11b slidably mounted thereon via slide mechanisms. Each linerbolt removal tool 11a,11b is mounted to and oriented such that its tool centre is located on a line $L_1$ radiating from the axis of rotation R, and its slide mechanism allows it move along that line. The travel of first primary carriage 12 is depicted by arrow $A_1$, the travel of first tool carriage 14 is shown by arrow $A_2$ and the travel of linerbolt removal tool 11a is shown by arrow $A_3$.

Each second carriage assembly 20 comprises a second primary carriage 22 mounted for travel on a second curved rail 23 disposed adjacent its respective frusto-conical end 31,32 of mill 30. A curved rail 23 is centred on the axis of rotation R of mill 30. A substantially straight rail 25 extends from second primary carriage 22 such that it is angled at the same angle as its respective frusto-conical end 31,32 and is offset from a second line $L_2$ radiating from the axis of rotation R. Tool carriages 24a, 24b are mounted for travel along rail 25. Each tool carriage 24a, 24b has respective linerbolt removal tools 21a, 21b slidably mounted thereon via slide mechanisms, and oriented such that the centre of each tool can travel axially along the line of a bolt 33 on one of the respective frusto-conical ends 31,32.

The travel of second primary carriage 22 is depicted by arrow $A_4$, the travel of tool carriage 24a is shown by arrow $A_5$ and the travel of linerbolt removal tool 21a along its slide mechanism is shown by arrow $A_6$.

In this embodiment, rail 23 is integrally formed with arch 27. In this embodiment the arches 17 and 27 are either permanently or removably secured relative to mill 30.

As each of first and second carriage assemblies 10, 20 provide no more than three degrees of freedom to their associated linerbolt removal tools 11a,11b, 21a and 21b, and because at least one of these degrees of freedom is angular movement about the axis of rotation R of mill 30, linerbolt removal tools 11a,11b, 21a and 21b can easily be aligned with linerbolts 33, and a simplified automated control system can be employed to guide linerbolt removal tools 11a,11b,21a and 21b.

In this above described embodiment there are two tool carriages 14a,14b and two tool carriages 24a, 24b, which each carry linerbolt tools. However in other not shown embodiments there may be only a single tool carriage 14a, 24a each carrying a linerbolt tool.

Figure 4:
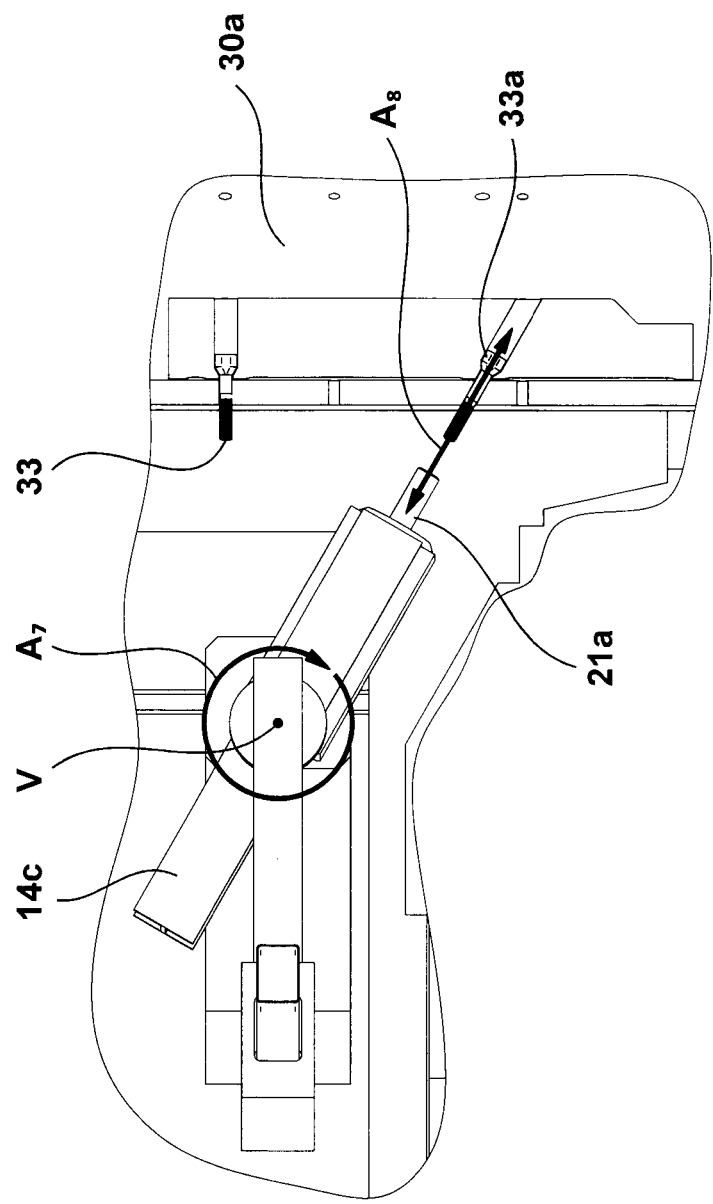
FIG. 4 is an enlarged elevation view of a tool carriage of a second embodiment of an apparatus for suspending and guiding a linerbolt removal tool in accordance with the present invention.

Apparatus 1 of the abovementioned embodiment is shown suspending and guiding linerbolt removal tools 11a,11b,21a and 21b externally of a grinding mill 30. In FIGS. 1 to 3, grinding mill 30 and the associated array of linerbolts 33 disposed thereon, is representative of the commonly used large diameter ore grinding mills. However, there is a small percentage of ore grinding mills which have a small number of linerbolts disposed at oblique/skewed angles relative to other bolts and these for example are typically found near the end portions of such a mill, particularly where the drive motor of the mill is located. Where such a linerbolt arrangement exists, the first carriage assembly 10 of apparatus 1 with three degrees of freedom could not access the small number of linerbolts disposed at oblique/skewed angles. However, if a fourth degree of freedom is added, this is achievable. FIG. 4 depicts in a second embodiment, a grinding mill 30a which is one of these grinding mills which has a small number of linerbolts 33a disposed at oblique/ skewed angle relative to the other linerbolts 33. In order to provide access to linerbolt 33a, a tool carriage 14c carrying linerbolt removal tool 21a, would be similar to the tool carriage 14a carrying linerbolt removal tool 21 of the first embodiment, however tool carriage 14c would be provided with a fourth degree of freedom by pivotally mounting linerbolt removal tool 21a about an axis V, as shown by Arrow $A_7$. This allows tool 21a to be aligned with linerbolt 33a as shown by Arrow $A_8$.

FIG. 5 depicts a third embodiment of an apparatus 101 for suspending and guiding a linerbolt removal tool 111 externally of a grinding mill 30a. Apparatus 101 comprises a carriage assembly 110 associated with linerbolt removal tool 111 used for knocking out linerbolts 33, on cylindrical main body portion 35 of grinding mill 30a.

Carriage assembly 110 comprises a substantially straight rail (track) 115 on platform 150 that extends parallel to the longitudinal axis of rotation of mill 30. A base carriage 112 is mounted for travel along rail 115. Base carriage 112 includes a support structure 160 that extends outwardly away from mill 30a and rail 115 and has an outrigger wheel 161 near its extremity. Mounted to support structure 160, above wheel 161 is a curved rail 117 centred on the axis of rotation of mill 30a. Tool carriage 114 is mounted for travel along curved rail 117. Tool carriage 114 has a tool support arm 162 extending towards mill 30a. A slide mechanism (mount) 163 is pivotally mounted to arm 162. Linerbolt removal tool 111 is slidably mounted to slide mechanism 163.

In use tool carriage 114 may move along rail 117, With slide mechanism 163 oriented in a central orientation as shown in FIG. 5, tool centre of linerbolt removal tool 111 will be located on a line radiating from the axis of rotation of mill 30a, and its slide mechanism 163 allows it move along that line and engage with linerbolts 33.

The travel of base carriage 112 is depicted by arrow $A_9$, the travel of tool carriage 114 is shown by arrow $A_{10}$ and the travel of linerbolt removal tool 111 is shown by arrow $A_{11}$. Pivotal rotation of slider mechanism 163 is shown by $A_{12}$. Altogether theses arrows $A_9$ to $A_{12}$, provide four degrees of freedom. The fourth degree of freedom, eg the pivotal movement depicted by arrow $A_{12}$, allows for the "odd type" of ore grinding mills which have a small number of linerbolts disposed at oblique/skewed angles. However, it should be understood that for commonly used grinding mills that do not have linerbolts at oblique/skewed angles the fourth degree of freedom, namely that shown by arrow $A_{12}$, could be omitted and apparatus 101 could be used with only three degrees of freedom.

An advantage of apparatus 101 is that curved rail 117 can be significantly smaller than that shown in the first embodiment, as it does not need to arch over mill 30a as does arch 17 over mill 30 of the first embodiment.

In the third embodiment, curved rail 117 is curved along its whole length so that it is centred on the axis of rotation of mill 30a. However, it should be understood that in a not shown embodiment rail 117 may be centred on the axis of rotation of mill 30a along only a portion of its length, and may differ in configuration in its lower section where it is supported by base carriage 112.

It should be understood that apparatus 1 or 101, could be used for either automated or semi-automated removal of linerbolts.

It should be understood that in other not shown embodiments, any of the linerbolt removal tools of the above described embodiments could be replaced with other tools.

The first embodiment directed to apparatus 1, which utilises curved rail 13 integrally formed with a supporting arch 17 is particularly suited to, but not limited to, an arrangement where the supporting arch 17 is installed at the time of initially installing grinding mill 30. The third embodiment directed to apparatus 101, which employs curved rail 117 is particularly suited to, but not limited to, an arrangement where the curved rail 117 is retrofitted for use with an existing grinding mill 30.

The terms "comprising" and "including" (and their grammatical variations) as used herein are used in inclusive sense and not in the exclusive sense of "consisting only of".

The invention claimed is:

1. An apparatus for suspending and guiding at least one tool externally of a grinding mill, said apparatus provides four or less degrees of freedom to said at least one tool, and wherein at least one of said degrees of freedom is angular movement about the axis of rotation of said mill, wherein the apparatus comprises a first curved rail disposed outside and at least partially surrounding a body portion of said mill, a first primary carriage mounted for travel along said curved rail, and a first tool carriage coupled to the first primary carriage, wherein said at least one tool is mounted to said tool carriage via a first slide mechanism, for axial movement thereof.

2. An apparatus as claimed in claim 1, wherein said four or less degrees of freedom is three degrees of freedom.

3. An apparatus as claimed in claim 2, wherein a second of said three degrees of freedom is linear movement along an axis parallel to the axis of rotation of said mill, and a third of said three degrees of freedom is linear movement along a line radiating from said axis of rotation.

4. An apparatus as claimed in claim 2, wherein a second of said three degrees of freedom is linear movement along a second axis offset to the axis of rotation of said mill, and a third of said three degrees of freedom is linear movement along a line orthogonal to said second axis.

5. An apparatus as claimed in claim 1, wherein the first curved rail is centered on the axis of rotation of said mill,
and the apparatus further comprises a substantially straight second rail parallel to the axis of rotation of said mill that is mounted to said first primary carriage, and the at least one first tool carriage is mounted for travel along said second rail,
and said first tool is oriented such that the center of said first tool is located on a first line radiating from the axis of rotation of said mill, said first slide mechanism allowing said first tool to move along said first line.

6. An apparatus as claimed in claim 5, wherein said mill has opposed frusto-conical ends connected to said cylindrical main body, and said apparatus further comprising at least a second curved rail adjacent one of said opposed frusto-conical ends and centered on the axis of rotation of said mill, a second primary carriage is mounted for travel along said second curved rail, a substantially straight third rail extends from said second primary carriage such that it is angled at the same angle as said one of said opposed frusto-conical ends and is offset from a second line radiating from the axis of rotation of said mill, and at least one second tool carriage is mounted for travel along said third rail, and a second tool is mounted to said second tool carriage via a second slide mechanism, for axial movement thereof.

7. An apparatus as claimed in claim 6, wherein said second curved rail is part of a second arch.

8. An apparatus as claimed in claim 6, wherein said second tool is a linerbolt removal tool.

9. An apparatus as claimed in claim 5, wherein said first curved rail is part of a first arch spanning over said cylindrical main body.

10. An apparatus as claimed in claim 5, wherein said first tool is a linerbolt removal tool.

11. An apparatus for suspending and guiding at least first and second linerbolt removal tools externally of a grinding mill,
said first linerbolt removal tool associated with a first carriage assembly and used for knocking out linerbolts on a cylindrical main body portion of said mill,
said second tool associated with a second carriage assembly and used for knocking out linerbolts on a frusto-conical end portion of said mill connected to said cylindrical main body portion,
said first carriage assembly providing no more than four degrees of freedom to its respective first linerbolt removal tool,
said second carriage assembly providing no more than three degrees of freedom to its respective second linerbolt removal tool and wherein at least one of said degrees of freedom for each of said first and second assemblies is angular movement about the axis of rotation of said mill,
wherein said first carriage assembly comprises a first primary carriage mounted for travel along a first curved rail disposed outside and at least partially surrounding said cylindrical main body, and a first secondary carriage coupled to the primary carriage, and wherein the first linerbolt removal tool is mounted to the first secondary carriage via a first slide mechanism, for axial movement thereof.

12. An apparatus as claimed in claim 11, wherein said first carriage assembly is centered on the axis of rotation of said mill,
and the first carriage assembly comprises a substantially straight second rail parallel to the axis of rotation of said mill that is mounted to said first primary carriage, and the first secondary carriage is mounted for travel along said second rail,
and said first linerbolt removal tool is oriented such that the center of said tool is located on a first line radiating from the axis of rotation of said mill, said first slide mechanism allowing said tool to move along said first line.

13. An apparatus as claimed in claim 12, wherein said first slide mechanism is pivotally mounted to said first secondary carriage.

14. An apparatus as claimed in claim 13, wherein said second carriage assembly comprising a second primary carriage mounted for travel along a second curved rail adjacent said frusto-conical end, a substantially straight third rail extends from said second primary carriage such that it is angled at the same angle as said opposed frusto- conical end and is offset from a second line radiating from the axis of rotation of said mill, a second slide mechanism mounted to said second primary carriage supports a second linerbolt removal tool for axial movement thereof along said second line.

15. An apparatus as claimed in claim 14, wherein said first curved rail is part of a first arch spanning over said cylindrical main body.

16. An apparatus as claimed in claim 15, wherein said second curved rail is part of a second arch.

17. An apparatus as claimed in claim 11, comprising a third linerbolt removal tool associated with third carriage assembly and identical to that of the second carriage assembly, said third linerbolt removal tool and its associated carriage assembly used for knocking out linerbolts on an opposed frusto-conical end portion of said mill.

18. An apparatus for suspending and guiding at least a first tool externally of a grinding mill,
said first tool associated with a carriage assembly and used for knocking out linerbolts on a cylindrical main body portion of said mill,
said carriage assembly providing no more than four degrees of freedom to its respective first tool, and wherein at least one of said degrees of freedom is angular movement about the axis of rotation of said mill,
wherein the carriage assembly comprises a curved rail having at least a curved portion, a tool carriage mounted for travel along said curved rail, and a slide mechanism mounted to said tool carriage, said slide mechanism slidably supporting said first tool.

19. An apparatus as claimed in claim 18, wherein said carriage assembly comprises a base rail oriented parallel to the axis of rotation of said mill, a base carriage is mounted for travel along said base rail, the curved rail is upwardly extending and supported by the base carriage, and movement of said tool carriage relative to said curved portion of said upwardly extending curved rail is angular movement about the axis of rotation of said mill, and said slide mechanism slidably supports said first tool so that it can be oriented such that the center of said tool is located on a first line radiating from the axis of rotation of said mill, said first slide mechanism allowing said tool to move along said first line.

20. An apparatus as claimed in claim 19, wherein said slide mechanism is pivotally mounted to said tool carriage.

* * * * *